United States Patent
Azgin (10) Patent No.: US 9,897,488 B2
(45) Date of Patent: Feb. 20, 2018

(54) VIBRATION BASED MECHANICAL IR DETECTOR AND AN IR IMAGING METHOD USING THE SAME

(71) Applicant: Kivanc Azgin, Ankara (TR)

(72) Inventor: Kivanc Azgin, Ankara (TR)

(*) Notice: Subject to any disclaimer, the term of this patent is extended or adjusted under 35 U.S.C. 154(b) by 108 days.

(21) Appl. No.: 15/028,435

(22) PCT Filed: Oct. 10, 2013

(86) PCT No.: PCT/TR2013/000311
§ 371 (c)(1),
(2) Date: Apr. 10, 2016

(87) PCT Pub. No.: WO2015/053720
PCT Pub. Date: Apr. 16, 2015

(65) Prior Publication Data
US 2016/0252400 A1   Sep. 1, 2016

(51) Int. Cl.
*G01J 5/00* (2006.01)
*G01J 5/44* (2006.01)
*G01J 5/02* (2006.01)
*G01J 5/20* (2006.01)

(52) U.S. Cl.
CPC ............... *G01J 5/44* (2013.01); *G01J 5/023* (2013.01); *G01J 5/20* (2013.01)

(58) Field of Classification Search
CPC .................. G01J 5/40; G01J 5/44; G01J 5/10
See application file for complete search history.

(56) References Cited

U.S. PATENT DOCUMENTS

| | | | |
|---|---|---|---|
| 5,193,911 A * | 3/1993 | Nix ........................... | G01J 5/34 250/332 |
| 2004/0140428 A1 | 7/2004 | Ionescu et al. | |
| 2011/0266445 A1* | 11/2011 | Beratan .................... | G01J 1/02 250/338.4 |
| 2013/0170517 A1 | 7/2013 | Duraffourg et al. | |
| 2013/0206988 A1 | 8/2013 | So | |
| 2014/0175284 A1* | 6/2014 | Roh ....................... | G01J 5/0853 250/338.4 |
| 2014/0226021 A1* | 8/2014 | Koechlin ................. | G01J 5/08 348/165 |

OTHER PUBLICATIONS

Tilmans H A C et al: "Single element excitation and detection of (micro-)mechanical resonators", Transducers. San Francisco, Jun. 24-27, 1991; [Proceedings of the International Conference on Solid State Sensors and Actuators], New York, IEEE, US, Jun. 24, 1991, pp. 533-537.
Danqi Zhao et al: "Uncooled bimaterial cantilever for infrared detection based on resonant frequency tracking", Micro and Nano Letters, The Institution of Engineering and Technology, Michael Faraday House, Six Hills Way, Stevenage, Herts. SG1 2AY, UK, vol. 7, No. 5, May 31, 2012, pp. 434-438.

* cited by examiner

*Primary Examiner* — Kenneth J Malkowski
(74) *Attorney, Agent, or Firm* — Gokalp Bayramoglu (57) ABSTRACT

The invention relates to a vibration based mechanical IR detector having one or more than one resonating pixel structure and an IR imaging method for measuring incoming IR radiation by means of mechanical resonance of the resonating pixels.

13 Claims, 9 Drawing Sheets

Figure 42 form of information (electrical voltage or current, deflection, etc). IR detectors have a wide span of applications including night vision and remote (contactless) temperature measurements. There are several types of IR detectors, mainly grouped under quantum infrared detectors and thermal infrared detectors.

VIBRATION BASED MECHANICAL IR DETECTOR AND AN IR IMAGING METHOD USING THE SAME

RELATED FIELD OF THE INVENTION

The invention relates to a vibration based mechanical IR detector having one or more than one resonating pixel structure and an IR imaging method for measuring incoming IR radiation by means of mechanical resonance of the resonating pixels.

BACKGROUND OF THE INVENTION (PRIOR ART)

Infrared (IR) detectors are sensors that convert incident IR radiation to an easy-to-process form of information (electrical voltage or current, deflection, etc). IR detectors have a wide span of applications including night vision and remote (contactless) temperature measurements. There are several types of IR detectors, mainly grouped under quantum infrared detectors and thermal infrared detectors.

Despite providing very high performance, quantum IR detectors of the prior art need cryogenic temperatures to operate which makes them costly and bulky devices.

On the other hand, thermal IR detectors of the prior art, usually called "bolometers", does not need cryogenic temperatures to operate and can be manufactured using MEMS fabrication techniques.

Bolometers operate on the idea of measuring the temperature change of the surface which the incident IR radiation heats. There have been demonstrated various bolometer topologies with;
  temperature dependent resistors, where the resistivity of a resistor changes with the temperature (IR→ΔT→ΔR→ΔV),
  temperature dependent diodes, where the turn-on voltage of the diode changes with the temperature (IR→ΔT→ΔV),
  thermal expansion based capacitive structures, where the increasing/decreasing temperature varies the gap of a capacitor structure (IR→ΔT→ΔC→ΔV).

One problem with these bolometers is the saturation of the readout electronics due to self heating. Another drawback is the need of an ADC (analog-to-digital converter) to make the pixel data available for digital processing. ADC adds complexity and noise to the readout electronics with increased die area.

As an example of thermal IR detectors of the prior art, US 2004/0140428 A1 defines a pixel structure, forming one element of a focal plane array, including a bolometer having a detector and an insulator for measuring the incoming IR radiation by means of measuring the temperature change of the surface pixel structure.

In addition, US 2013/206988 A1 can also be an example of the thermal IR detectors of prior art. In US 2013/206988 A1, a detector having organic layers that can be utilized to produce a phototransistor for the detection of IR radiation is defined. The wavelength range of the defined IR detector can be modified by incorporating materials sensitive to photons of different wavelengths according to the invention. It has also been claimed that a photoconductor structure can be used instead of a phototransistor where the photoconductor can incorporate PbSe or PbS quantum dots and organic materials as part of an OLED structure. A detected IR image can be displayed to a user as the organic materials can be used to create an organic light-emitting device according to the invention.

BRIEF DESCRIPTION AND AIMS OF THE INVENTION

The present invention defines a method of measuring incoming IR radiation by means of mechanical resonance of pixels and a vibration based mechanical IR detector based on the said resonating pixel structure.

The method of the present invention can be interpreted similar to the thermal sensitivity of the resistivity of a resistor where the resonance frequencies of the mode shapes of a mechanical structure is also dependent on the temperature.

The main aim of this method is to measure the shift in the resonance frequency of an adequately designed resonator in the presence of IR radiation.

The proposed structures of the present invention enable not only the precise measurement of incident IR power but also the adjustment of sensitive wavelength of the detector structure.

The detector of the present invention can be fabricated as a single pixel for remote temperature detection, or as a Focal Plane Array (FPA) for an IR camera application.

The aims of this vibration, based mechanical IR detector and the IR imaging method of the present invention are;
  To adjust and fine tune the dynamic range and resolution as in the frequency based sensors,
  Eliminating the need for an analogue to digital converter as the frequency is a countable parameter,
  Over 100 image count per second,
  To create a vibration based mechanical IR detector that can be manufactured by using MEMS (Micro Electro Mechanical Systems) and/or integrated circuit techniques,
  Eliminating the need for cryogenic cooling systems as in the quantum IR detectors,
  To increase the measurement range and accuracy of the pixel,
  Creating higher resolution detectors having the same sensor array surface by measuring the IR radiation with smaller pixels,
  Creating energy efficient IR detectors in comparison with prior art IR detectors,
  Creating smaller and more compact IR detectors in comparison with prior art IR detectors,
  Rendering a pixel to measure smaller temperature differences,
  To increase the application flexibility by making the detector's individual pixels resonant wavelength adjustable using a variable resonant cavity.

DEFINITION OF THE FIGURES

In order to explain the present invention in more detail, the following figures have been prepared and attached to the description. The list and the definition of the figures are given below.

DEFINITION OF THE ELEMENTS (FEATURES/COMPONENTS/PARTS) ON THE FIGURES

The definition of the features/components/parts which are covered in the figures that are prepared in order to explain the present invention better are separately numbered and given below.

1. Complete pixel structure
2. Resonating pixel plate
3. Pixel substrate
4. Anchor
5. Extension arm
6. Cantilever
7. Electrical connection pad
8. Driving capacitive electrode
9. Sensing capacitive electrode
10. Vibration based mechanical IR detector

DETAILED DESCRIPTION OF THE INVENTION

The present invention is based on five key aspects of the proposed mechanical resonance based IR detector:
  Mechanical structure of the pixel and corresponding mode shapes,
  Materials that the pixel structure is made up of,
  Actuation and detection of mechanical resonance,
  Detection of frequency shift of the mechanical resonance,
  On-the-fly tuning of sensitive wavelength band by means of a resonant light cavity.
Mechanical structures and corresponding mode shapes:
  Mechanical structure of the pixel (1) of the vibration based IR detector is composed of a resonating pixel plate (2), a pixel substrate (3) where the plate (2) is attached to, one or more anchors (4) and/or extension arms (5) and one or more cantilevers (6) that are attaching the plate (2) to the substrate (3).

In regard to different embodiments of the invention, upper and/or lower surfaces of this pixel plate (2) can be coated with an IR absorbing material.

The mode shapes are totally dependent on the shape of the plate (2) and the boundary conditions like size and positions of the extension arms (5) and anchorage (4) regions.

The temperature dependency of the mode shape frequencies has two different sources. Temperature changes affect both the size of the pixel structure (1) and the Young's Modula of the materials which the pixel structure (1) is made up of.

Change in the geometric dimensions (expansion based):
    Changing the geometric dimensions of the pixel structure (1), especially when the thermal expansion coefficients of in-contact materials are considerably different, results in internal stresses within the structure (1), yielding a change in the structural stiffness and hence a shift in the resonance frequency.
  Temperature dependent Young's Modulus change: This directly alters the stiffness of the pixel structure (1) material and thus a shift in the resonance frequency.

In the present invention 7 different plate (2)—anchor (4)/extension arm (5) combinations are explained as different embodiments of the invention:
- 4 corners fixed
- 2 corners fixed
- 4 edges segment-fixed
- 2 edges segment-fixed
- Cantilever
- 2 edges fixed
- Center fixed All these combinations and their operational mode shapes are given in detail in FIGS. 1 to 40. These embodiments utilize a combined "expansion based" and "Thermal Coefficient of Young's Modulus based" frequency shifts.

The operation of this vibration based IR detector is also based on the incident IR radiation power that heats the resonating pixel plate (2) of which the resonance frequency shifts according to the mechanisms explained above. The thermal energy absorbed by the plate (2) has 3 means of dissipation:
1. Conductive
2. Convective
3. Radiative Among these, with vacuum ambient of the pixel structure (1), only conductive heat loss is significant. To have higher resolution, the plate (2) should be thermally isolated from the substrate (3) it sits on. For this purpose, extension arm (5) structures are used for extending the anchorage regions of the pixel plates (2) in order to increase thermal resistance between the plate (2) and the substrate (3). FIGS. 36-40 show 2 edges segment-fixed pixel structure (1) with extension arms (5), improving the sensitivity of the detector (more frequency shift per incident IR power). Remaining 6 plate-anchor combinations can also be implemented with extension arm (5) structures.

Mechanical structure of the preferred embodiment of the present invention is a center fixed pixel (2).

Materials that the Pixel Structure is Made Up of:

To maximize the performance of the detector, material selection is critical.

For maximum sensitivity, resonating pixel plate (2), which is the deforming body of the pixel structure (1), should have high thermal coefficient of Young's Modulus and high thermal coefficient of expansion while the thermal conductivity of the pixel plate (2) and the anchors (4) or extension arms (5) should be as low as possible.

In order to improve the quality factor of the mode shapes, the pixel plate (2) should also be made up of a low-loss material such as a single crystal silicon or quartz. In addition, glass anchors (4), extension arms (5) and/or cantilevers (6) are most suitable for the preferred embodiment of the present invention.

Figure 41:
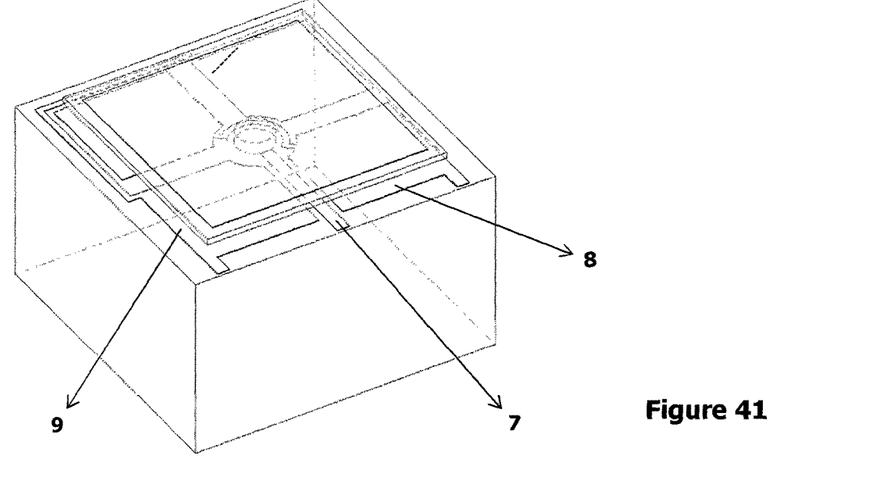
FIG. 41 is the isometric view of a complete center fixed pixel
Figure 42:
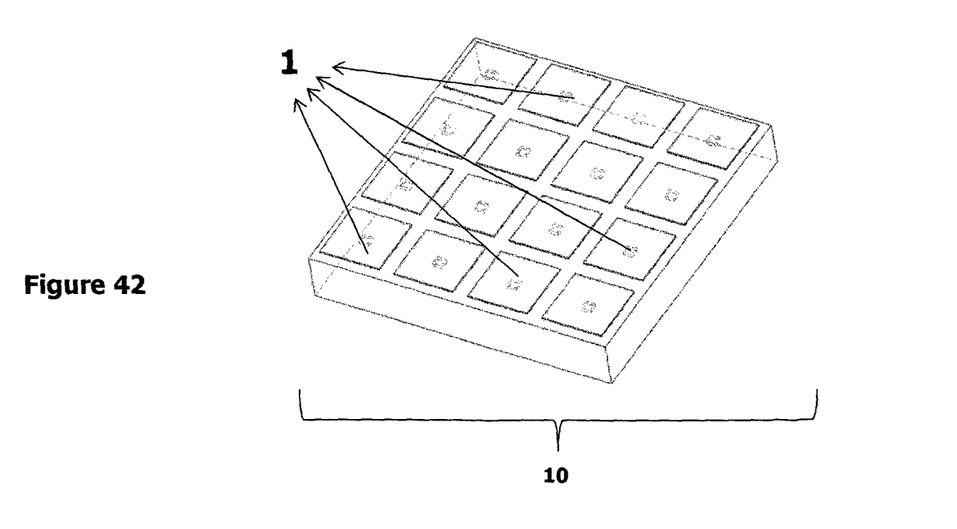
FIG. 42 is the isometric view of the vibration based IR detector in pixel array form

Use of MEMS fabrication techniques is best suited for the fabrication of such detectors. FIG. 41 shows isometric view of the preferred embodiment of the present invention as a complete pixel structure (1), where the substrate (3) is glass with metal padding on top. The resonating pixel plate (2) is made up of silicon and is attached to the substrate (3) via a glass anchor (4) in the middle. On top of the pixel plate (2), a coating with high IR absorptivity is deposited. This layer can be of TiN (Titanium Nitride) or very thin metal or metal alloy that matches the impedance of free space (~377 Ohm).

A similar structure can be obtained in another embodiment of the present invention by using float zone silicon as the substrate (3) and the metal padding on top. The resonating pixel plate (2) can be bonded on a conductive anchor (4), which provides the bias potential to the resonating pixel plate (2). These fabrication techniques are not the only two options and these fabrication techniques can be applied for other structures within the present invention.

Actuation and Detection of Mechanical Resonance:

In the present invention 4 different combinations can be used to excite and detect the resonance deflections of the resonating pixel plate (2):
- Capacitive actuation and detection,
- Capacitive actuation and piezoelectric/piezoresistive detection,
- Piezoelectric actuation and capacitive detection,
- Piezoelectric actuation and piezoelectric/piezoresistive detection.

Figure 38:
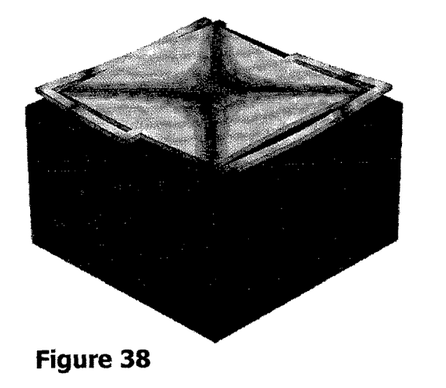
FIG. 38 is the isometric deflection pattern view of the 9$^{th}$ mode shape of the 2 edges segmented-fixed with long arms pixel
Figure 39:
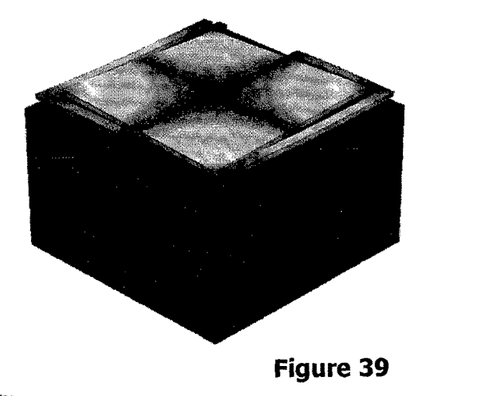
FIG. 39 is the isometric deflection pattern view of the 12$^{th}$ mode shape of the 2 edges segmented-fixed with long arms pixel
Figure 40:
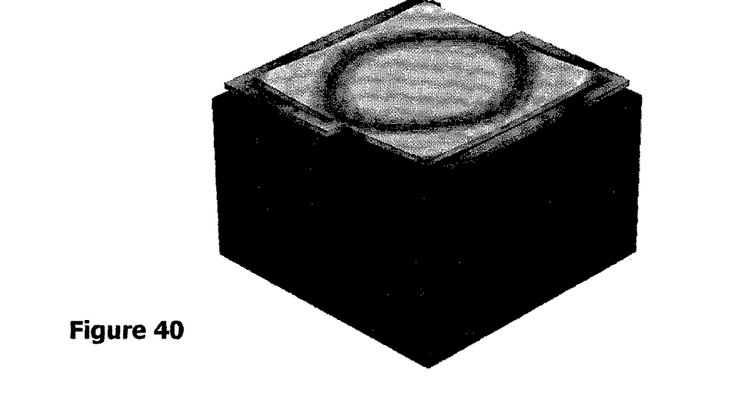
FIG. 40 is the isometric deflection pattern view of the 13$^{th}$ mode shape of the 2 edges segmented-fixed with long arms pixel

FIGS. 38-40 show the modal Finite Element Model (FEM) simulation of the center-fixed pixel (2) arrangement where the corners on the same diagonal deflect together. Thus, the driving capacitive electrode (8) which is the driving actuator of the plate (2) and the sensing capacitive electrode (9) which senses the motion of the plate, are placed to pick-up this motion with diagonal pads shorted. The placement of the pads solely depends on the deflection pattern of the mode shape. The pads should be placed under maximum-deflection regions of the mode shape of the resonating pixel plate (2) and the pads under in-phase (moving together) regions should be electrically connected. The deflecting plate should also be at an electrostatic potential. For this purpose, an electrical connection pad (7) is placed. As this is the preferred embodiment of the present invention other arrangements will have the same approach for capacitive actuation-detection.

For piezoresistive/piezoelectric actuation and detection, piezoactuators and piezoresistors should be placed on the resonating pixel plate (2) where maximum stress is induced. It is also possible to use hybrid approaches where detection is capacitive and actuation is piezoelectric, or detection is piezoelectric/piezoresistive and the actuation is capacitive.

Detection of Frequency Shift of the Mechanical Resonance:

In the present invention, 5 different methods to detect resonance frequency shifts, can be used as explained below:

Self-resonance with frequency counting: In self resonance scheme, the detected motion signal is fed back to the actuation mechanism where the phase relation satisfies the mechanical resonance. Counting the frequency of the pixel plate (2) when it is resonating directly gives the resonance frequency.

Phase Locked Loop (PLL) with frequency counting: In PLL, a voltage controlled oscillator (VCO) generates the driving signal. The motion is sensed through the detection mechanism and a controller adjusts the frequency of the VCO to satisfy a phase relation that results in mechanical resonance. Counting the frequency of the VCO output when it is resonating directly gives the resonance frequency.

Amplitude detection: The resonating pixel plate (2) can be excited with a constant frequency signal, where the frequency of the excitation is on the skirts of the frequency-amplitude response curve of the resonating pixel plate (2). Thus, depending on the shift of this response curve, the gain of the mechanical pixel plate (2) shifts, which can be detected as an amplitude change of the resonator.

Phase detection: The resonating pixel plate (2) can be excited with a constant frequency signal, where the frequency of the excitation is in the middle of the frequency-phase response slope of the plate (2). Thus, depending on the shift of this response curve, shifts in the phase between the motion of mechanical pixel plate (2) and the applied excitation can be detected using a phase detector.

Fixed-frequency excitation with feedback: The resonating pixel plate (2) can be excited with a constant frequency signal and the overall equivalent spring constant of the excited mode shape can be modified (i.e., with electrostatic tuning) to obtain resonance. The amount of spring constant correction gives the amount of frequency shift.

Depending on the capacitive/piezo character of the actuation and detection mechanisms, one of the above methods can be utilized.

Figures 1, 2:
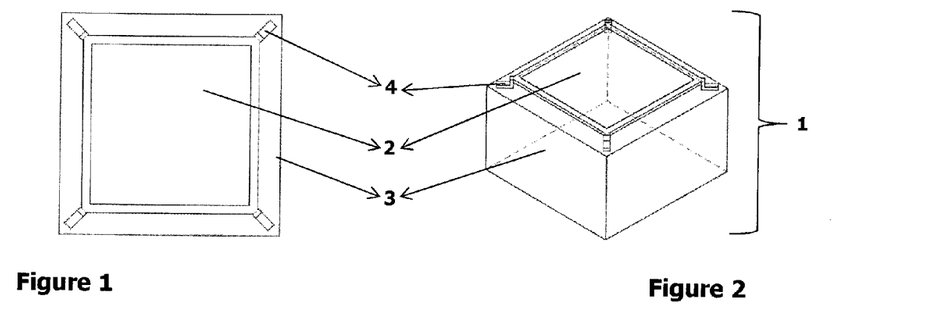
FIG. 1 is the top view of the 4 corners fixed pixel
FIG. 2 is the isometric view of the 4 corners fixed pixel
Figure 3:
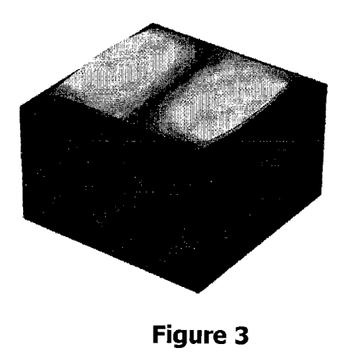
FIG. 3 is the isometric deflection pattern view of the $1^{st}$ mode shape of the 4 corners fixed pixel
Figure 4:
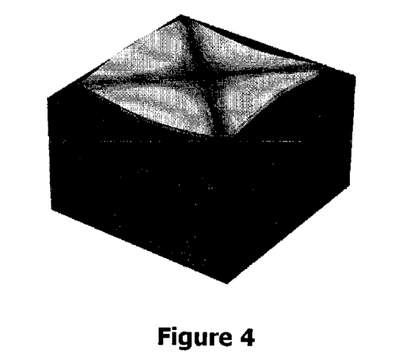
FIG. 4 is the isometric deflection pattern view of the $4^{th}$ mode shape of the 4 corners fixed pixel
Figure 5:
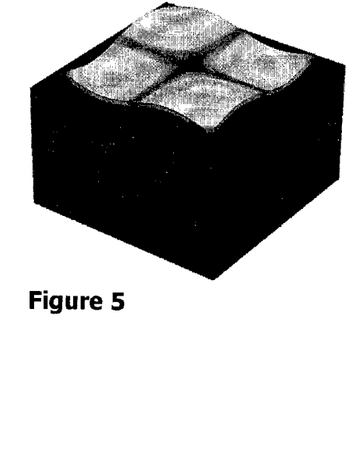
FIG. 5 is the isometric deflection pattern view of the 6$^{th}$ mode shape of the 4 corners fixed pixel
Figure 6:
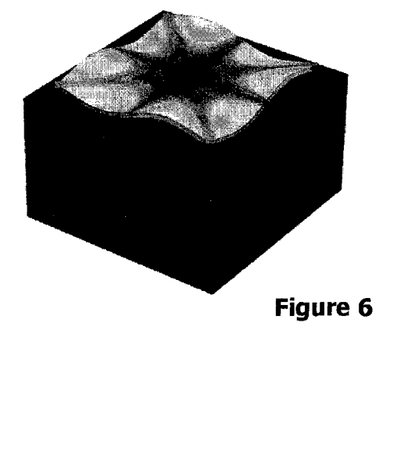
FIG. 6 is the isometric deflection pattern view of the 11$^{th}$ mode shape of the 4 corners fixed pixel
Figure 7:
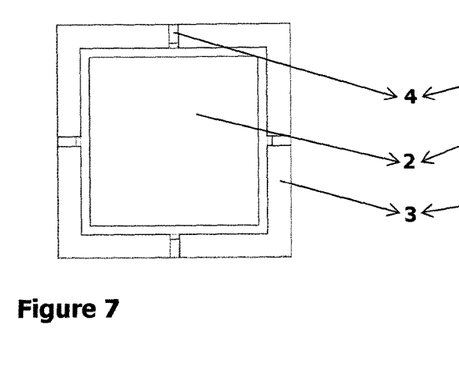
FIG. 7 is the top view of the 4 edges segment-fixed pixel
Figure 8:
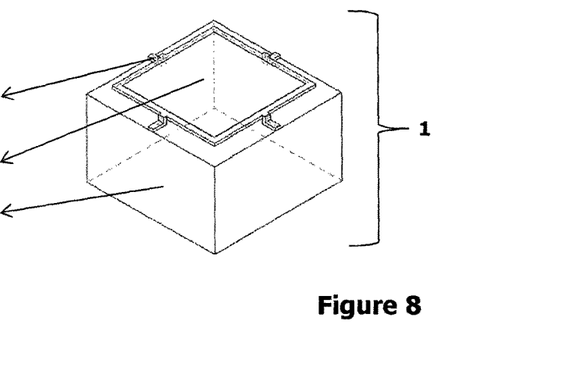
FIG. 8 is the isometric view of the 4 edges segment-fixed pixel
Figure 9:
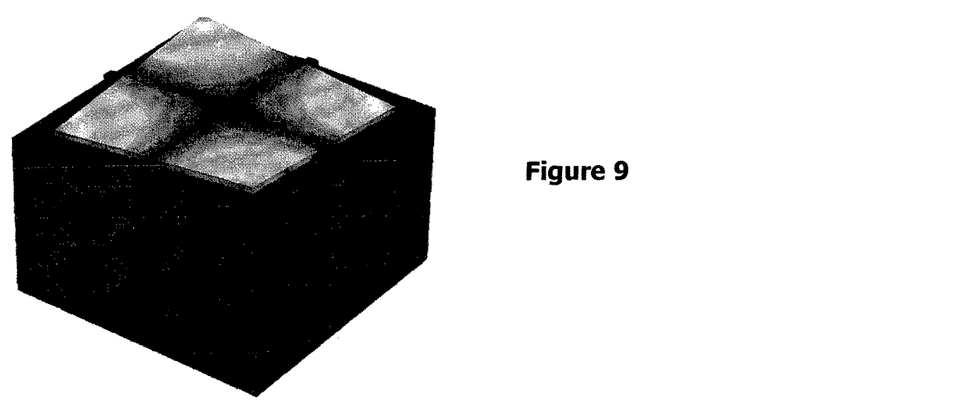
FIG. 9 is the isometric deflection pattern view of the 1$^{st}$ mode shape of the 4 edges segment-fixed pixel
Figure 10:
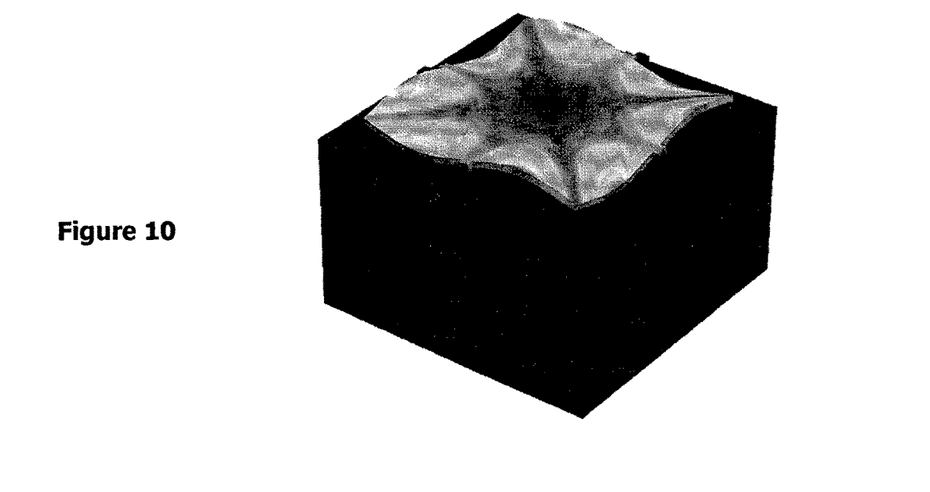
FIG. 10 is the isometric deflection pattern view of the 11$^{th}$ mode shape of the 4 edges segment-fixed pixel
Figure 11:
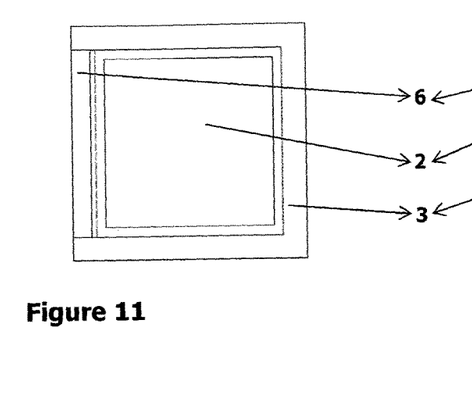
FIG. 11 is the top view of the cantilever type pixel
Figure 12:
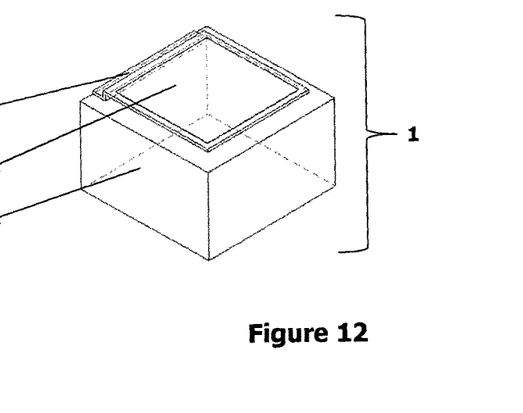
FIG. 12 is the isometric view of the cantilever type pixel
Figure 13:
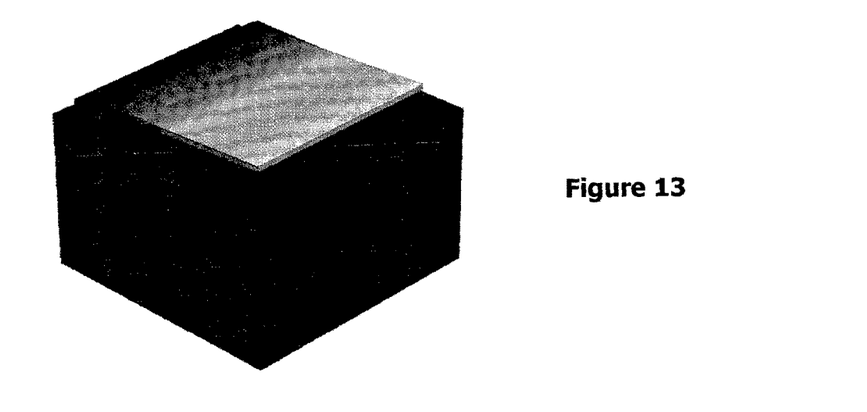
FIG. 13 is the isometric deflection pattern view of the 1$^{st}$ mode shape of the cantilever type pixel
Figure 14:
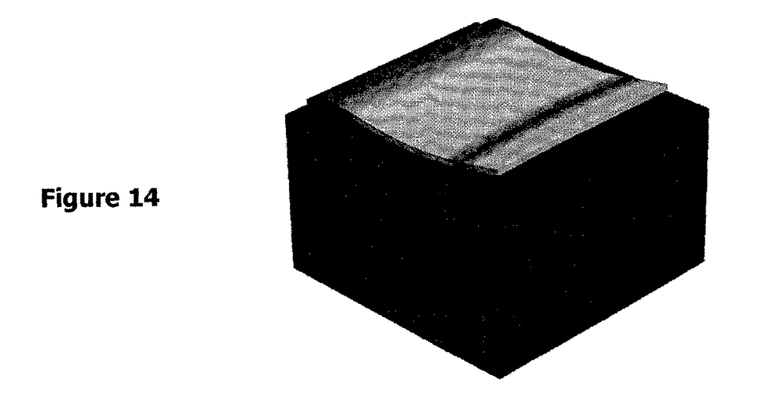
FIG. 14 is the isometric deflection pattern view of the 3$^{rd}$ mode shape of the cantilever type pixel
Figure 15:
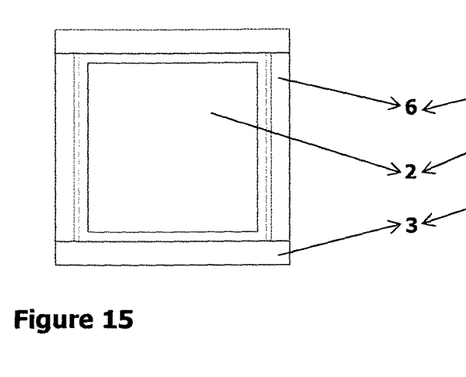
FIG. 15 is the top view of the 2 edges fixed cantilever type pixel
Figure 16:
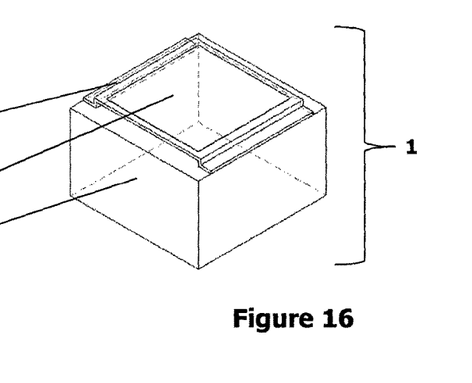
FIG. 16 is the isometric view of the 2 edges fixed cantilever type pixel
Figure 17:
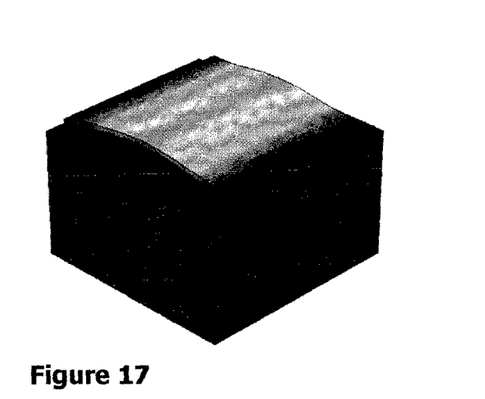
FIG. 17 is the isometric deflection pattern view of the 1$^{st}$ mode shape of the 2 edges fixed pixel
Figure 18:
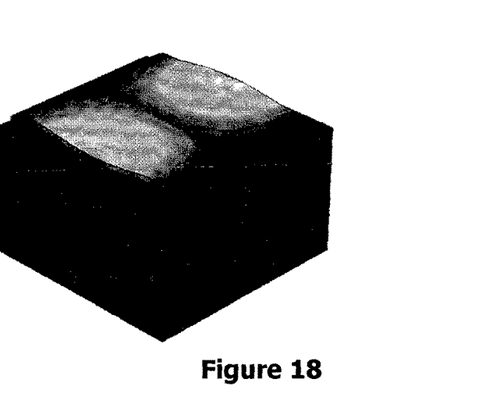
FIG. 18 is the isometric deflection pattern view of the 2$^{nd}$ mode shape of the 2 edges fixed pixel
Figure 19:
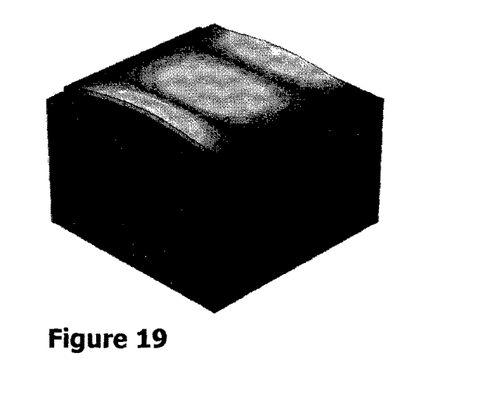
FIG. 19 is the isometric deflection pattern view of the 3$^{rd}$ mode shape of the 2 edges fixed pixel
Figure 20:
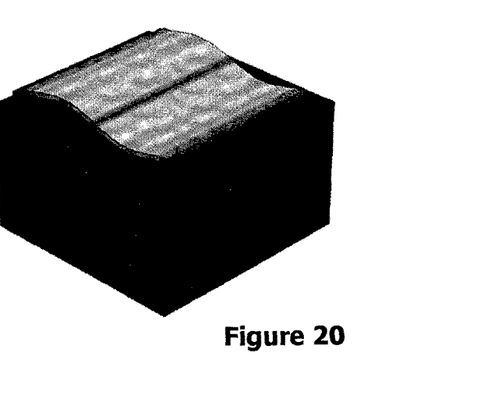
FIG. 20 is the isometric deflection pattern view of the 4$^{th}$ mode shape of the 2 edges fixed pixel
Figure 21:
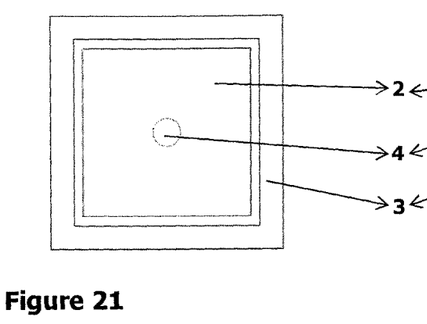
FIG. 21 is the top view of the center fixed pixel
Figure 22:
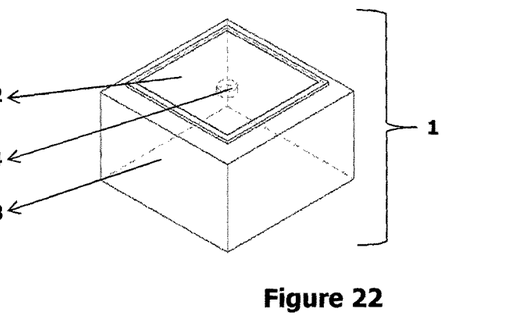
FIG. 22 is the isometric view of the center fixed pixel
Figure 23:
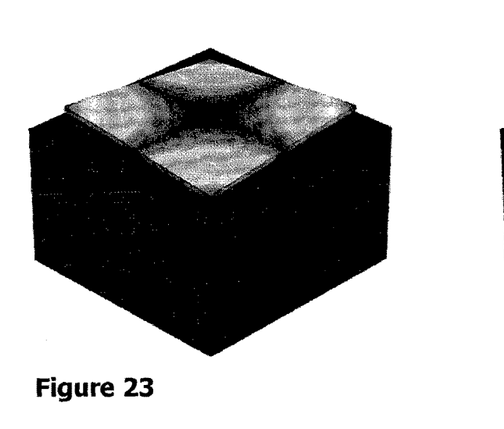
FIG. 23 is the isometric deflection pattern view of the 5$^{th}$ mode shape of the center fixed pixel
Figure 24:
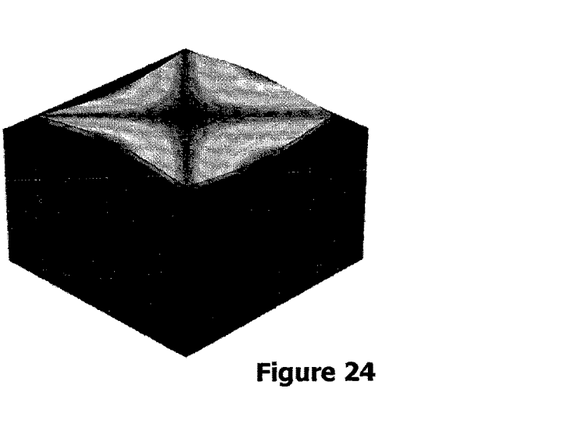
FIG. 24 is the isometric deflection pattern view of the 6$^{th}$ mode shape of the center fixed pixel
Figure 25:
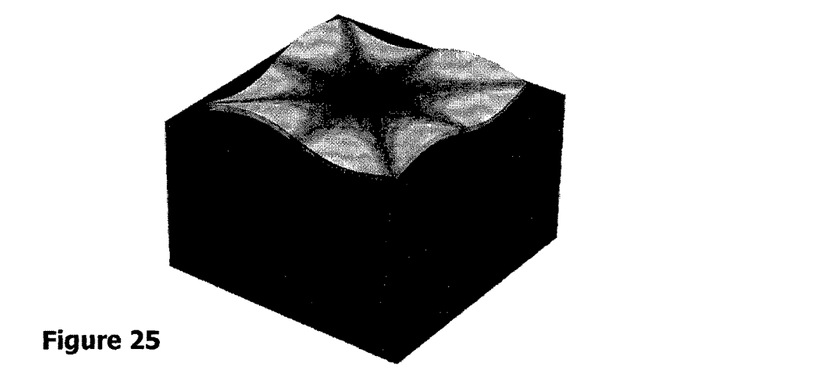
FIG. 25 is the isometric deflection pattern view of the 10$^{th}$ mode shape of the center fixed pixel
Figure 26:
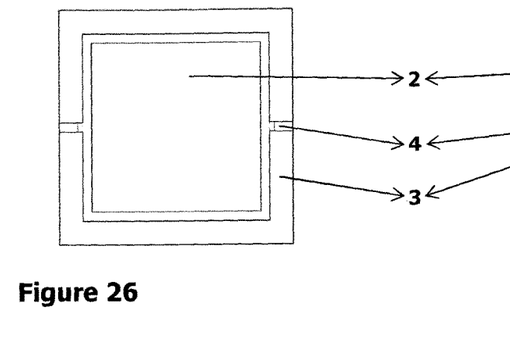
FIG. 26 is the top view of the 2 edges segmented-fixed pixel
Figure 27:
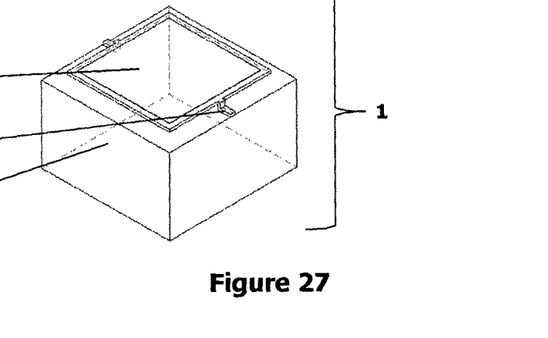
FIG. 27 is the isometric view of the 2 edges segmented-fixed pixel
Figure 28:
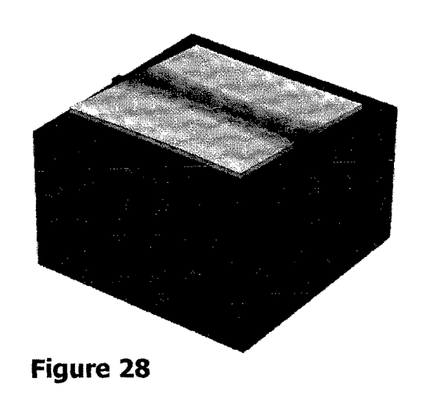
FIG. 28 is the isometric deflection pattern view of the 1$^{st}$ mode shape of the 2 edges segmented-fixed pixel
Figure 29:
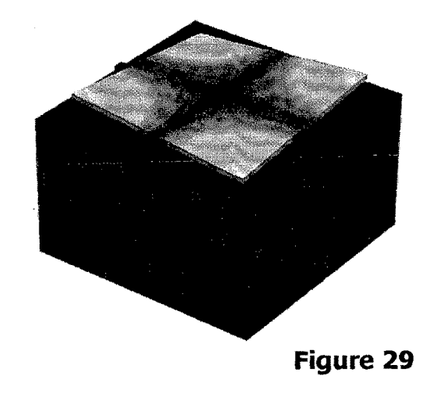
FIG. 29 is the isometric deflection pattern view of the 3$^{rd}$ mode shape of the 2 edges segmented-fixed pixel
Figure 30:
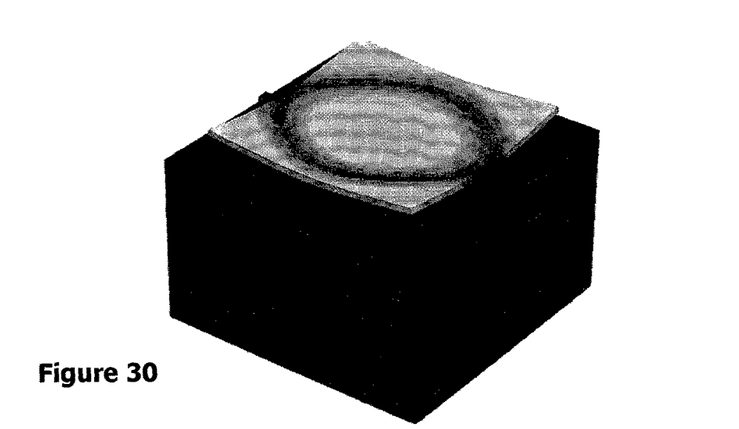
FIG. 30 is the isometric deflection pattern view of the 5$^{th}$ mode shape of the 2 edges segmented-fixed pixel
Figure 31:
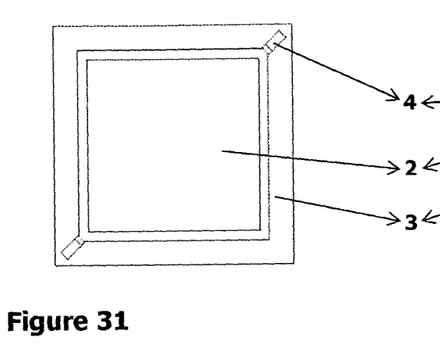
FIG. 31 is the top view of the 2 corners fixed pixel
Figure 32:
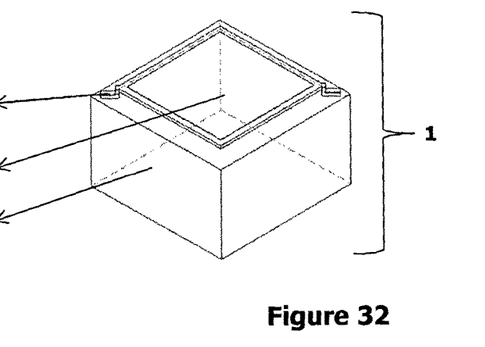
FIG. 32 is the isometric view of the 2 corners fixed pixel
Figure 33:
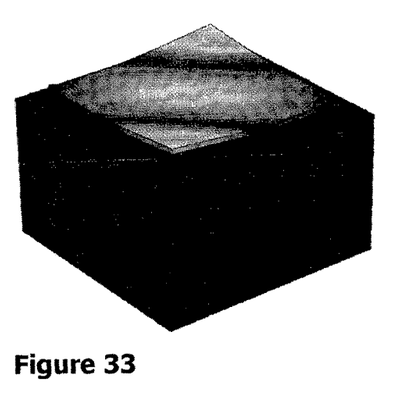
FIG. 33 is the isometric deflection pattern view of the 5$^{th}$ mode shape of the 2 corners fixed pixel
Figure 34:
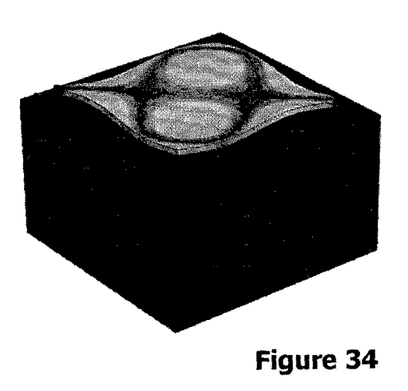
FIG. 34 is the isometric deflection pattern view of the 12$^{th}$ mode shape of the 2 corners fixed pixel
Figure 35:
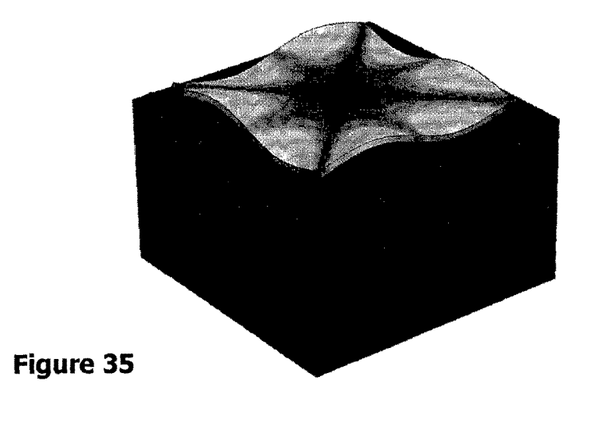
FIG. 35 is the isometric deflection pattern view of the 14$^{th}$ mode shape of the 2 corners fixed pixel
Figures 36, 37:
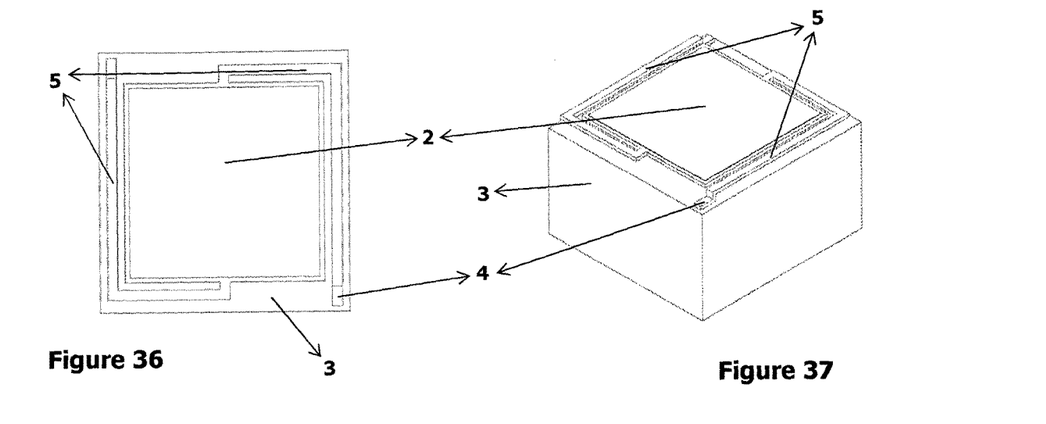
FIG. 36 is the top view of the 2 edges segmented-fixed with long arms pixel
FIG. 37 is the isometric view of the 2 edges segmented-fixed with long arms pixel

On-the-Fly Tuning of Sensitive Wavelength Band by Means of a Resonant Light Cavity:

Another aspect of IR detectors is the wavelength of the IR emission which the detector is sensitive to. The vibration based IR detector of the present invention, especially with the capacitive actuation and detection mechanisms, allows fine tuning of the sensitive wavelength by adjusting the gap between the resonating pixel plate (2) and the substrate (3). When a light beam with a wavelength of $\lambda$ is trapped in a cavity which is sized $\lambda/4$, it accumulates (or resonates) in that cavity, which is also known as cavity resonance of light. FIG. 19 shows the pixel embodiment with L-shaped arms, segment-fixed at 2 edges. The gap between the plate and the substrate (shown with red arrows in the side view (b)) forms a cavity. Modifying this gap (i.e. electrostatically with dedicated electrodes) allows tuning of sensitive wavelength.

The invention claimed is:

1. A vibration based mechanical IR detector to convert incident IR radiation to an easy-to-process form of information characterized by having more than one resonating pixel structure, comprising:
   a resonating pixel plate,
   a pixel substrate where the resonating pixel plate is attached to,
   an attaching the resonating pixel plate to the pixel substrate,
   one or more driving capacitive electrode which is a driving actuator of the resonating pixel plate,
   one or more sensing capacitive electrode to pick-up the motion of the resonating pixel plate, and
   one or more electrical connection pads to keep the resonating pixel plate at an electrostatic potential,
   wherein the anchor is centrally fixed between the resonating pixel plate and the pixel substrate.

2. The vibration based mechanical IR detector of claim 1, wherein at least an upper or a lower surface of the resonating pixel plate is coated with an IR absorbing material.

3. The vibration based mechanical IR detector of claim 2, wherein the IR absorbing material is TiN (Titanium Nitride).

4. The vibration based mechanical IR detector of claim 2, wherein the IR absorbing material is a metal or metal alloy that matches the impedance of free space, wherein the impedance of free space is about 377 Ohm.

5. The vibration based mechanical IR detector according to claim 4, wherein the driving capacitive electrode and the sensing capacitive electrode under in-phase deflection regions are electrically connected.

6. The vibration based mechanical IR detector according to claim 1, wherein the driving capacitive electrode and the sensing capacitive electrode are placed under maximum-deflection regions of a mode shape of the resonating pixel plate.

7. The vibration based mechanical IR detector according to claim 1, wherein the vibration based mechanical IR detector provides on-the-fly tuning.

8. The vibration based mechanical IR detector according to claim 7, wherein the on-the-fly tuning of a sensitive wavelength band is provided by means of a resonant light cavity by adjusting a gap between the resonating pixel plate and the pixel substrate.

9. The vibration based mechanical IR detector according to claim 1, wherein the resonating pixel plate is made of a low-loss material selected from the group consisting of single crystal silicon and quartz.

10. The vibration based mechanical IR detector according to claim 1, wherein the pixel substrate has a metal padding on top that matches the impedance of free space.

11. The vibration based mechanical IR detector according to claim 1, where the resonating pixel plate is made of silicon.

12. The vibration based mechanical IR detector according to claim 1, wherein the pixel substrate is made of float zone silicon, the pixel substrate and a metal padding on top are bonded on a conductive anchor, which provides the bias potential to the resonating pixel plate.

13. The vibration based mechanical IR detector according to claim 1, wherein piezoactuators and piezoresistors are placed on the resonating pixel plate where maximum stress is induced.

* * * * *